United States Patent
Bennett et al.

[11] 3,880,746
[45] Apr. 29, 1975

[54] PRODUCTION OF LUBRICATING OILS

[75] Inventors: Robert Neil Bennett, Englefield Green; Brian James Oswald, Cove near Farnborough; Terence Norman Thurlow, New Haw, all of England

[73] Assignee: The British Petroleum Company Limited, London, England

[22] Filed: Jan. 30, 1974

[21] Appl. No.: 437,974

[30] Foreign Application Priority Data
Feb. 8, 1973  United Kingdom............... 6214/73

[52] U.S. Cl............................. 208/59; 208/18
[51] Int. Cl............................. C10g 37/02
[58] Field of Search.................. 208/18, 59, 57

[56] References Cited
UNITED STATES PATENTS
| | | | |
|---|---|---|---|
| 3,654,133 | 4/1972 | Olson............................. | 208/59 |
| 3,663,423 | 5/1972 | Bennett et al. ................. | 208/59 |
| 3,761,388 | 9/1973 | Bryson et al. .................. | 208/59 |

*Primary Examiner*—Herbert Levine
*Attorney, Agent, or Firm*—Morgan, Finnegan, Durham & Pine

[57] ABSTRACT

A three-stage, wholly catalytic process for the production of lubricating oil comprises the steps of hydrogenation to improve viscosity index and reduce sulphur content, catalytic dewaxing to reduce pour point and hydrogenation over a halogen containing catalyst to improve viscosity index without increasing the pour point. The optimum conditions for the first stage are those giving a first stage product sulphur content of 0.1 to 0.2 percent wt. The catalyst may be one or more group VI or VII hydrogenating metals on a refractory oxide. The second stage catalyst is preferably platinum group metal incorporated with an alkali metal deficient mordenite. The third stage catalyst may be as for the first catalyst with 1-10 percent wt. halogen, preferably fluorine.

8 Claims, 1 Drawing Figure

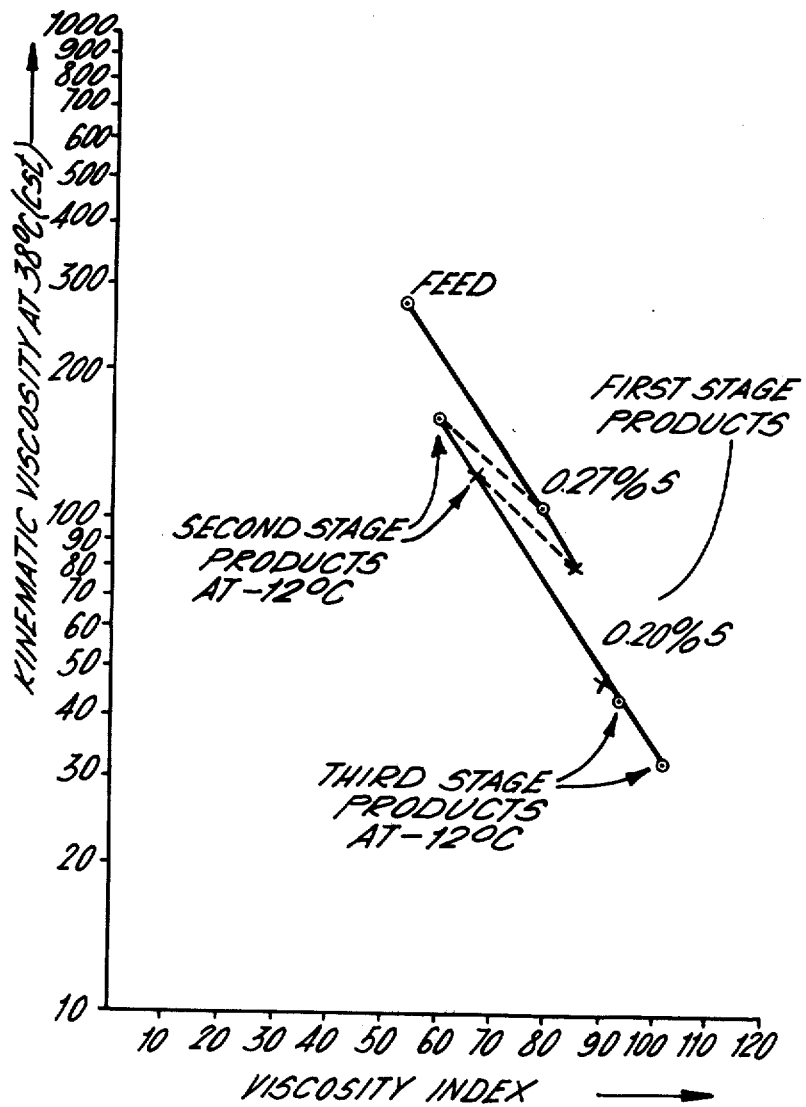

PRODUCTION OF LUBRICATING OILS

This invention relates to the production of lubricating oils by a wholly catalytic route without the use of solvents.

It is well known that, in lubricating oil production, the requirements of high viscosity index and low pour point conflict. Aromatics and ring compounds which have to be removed or converted to improve viscosity index have low pour points. The waxes which have to be removed to improve pour points have high viscosity indexes. The situation is further complicated by the fact that lubricating oil fractions contain mixed cyclic-paraffinic compounds (e.g. aromatic or naphthenic rings with paraffinic side chains) having intermediate viscosity indexes and pour points.

In practice, the established route of solvent extraction of aromatics and solvent dewaxing provides a satisfactory solution at moderate levels of viscosity index and pour point. Very high viscosity indexes or very low pour points are, however, difficult to achieve with solvents and there are also other practical and economic drawbacks to solvent processes. Considerable research effort has, therefore, been expended in recent years on hydrocatalytic processes as replacements for one or both of the solvent steps. A wholly catalytic route is, for example, described and claimed in U.S. Pat. No. 3,663,423. In that patent a wholly catalytic process for the production of lubricating oils from a petroleum feedstock boiling above 350°C without the use of solvents for aromatic and wax removal comprises the steps of passing the oil over a catalyst comprising one or more hydrogenating components selected from Groups VIa and VIII of the Periodic Table on a refractory oxide support together with hydrogen at a temperature of from 343° to 454°C and a pressure of from 70 to 210 bars gauge to give a material of reduced aromatic content and improved viscosity index and also a catalyst comprising one or more hydrogenating components selected from Groups VIa and VIII of the Periodic Table incorporated with a crystalline mordenite of reduced alkali-metal content together with hydrogen at a temperature of from 232° to 510°C and a pressure of 7 to 210 bars gauge to give a material of reduced wax content and improved pour point, said steps of viscosity index improvement and catalytic dewaxing being carried out in either order, and recovering a lubricating oil fraction of both improved viscosity index and improved pour point.

It is now been found that a wholly catalytic process can be further improved by using three stages, and using a particular catalyst in the third stage. In the third stage viscosity index can be improved without adversely affecting pour point.

According to the present invention a wholly catalytic process for the production of lubricating oils from a petroleum feedstock boiling above 350°C without the use of solvents for aromatic and wax removal comprises the steps of passing the oil over a catalyst comprising one or more hydrogenating components selected from Groups VIa and VIII of the Periodic Table on a refractory oxide support together with hydrogen at a temperature of from 343° to 454°C and a pressure of 70 to 210 bars gauge, then over a catalyst comprising one or more hydrogenating components selected from Groups VIa and VIII of the Periodic Table incorporated with a crystalline mordenite of reduced alkali metal content together with hydrogen at a temperature of from 250° to 500°C and a pressure of from 7 to 210 bars gauge, and then over a catalyst comprising one or more hydrogenating components selected from Groups VIa and VIII of the Periodic Table on a refractory oxide support containing 1 to 10 percent wt of halogen together with hydrogen at a temperature of from 300° to 450°C and a pressure of from 30 to 210 bars gauge and recovering a product of decreased pour point and increased viscosity index as compared with the feedstock.

The feedstock to the process is preferably a vaccum distillate fraction boiling within the range 350°–600°C. Since lubricating oils are marketed in several grades with relatively narrow boiling ranges, distillation to give relatively narrow boiling range cuts is required at some stage. In the present invention, a wide boiling range cut may be used as feedstock and distillation into narrower cuts given after the first, second or third hydrocatalytic treatments or distillation may take place before the hydrocatalytic treatments and individual cuts may be hydrotreated. The former route has the advantage of avoiding blocked operation but the latter route has the advantage that optimum hydrogenating conditions may be chosen for each cut.

The support may be a single oxide e.g. alumina, which is preferred, or a mixed oxide e.g. silica-alumina. Suitable proportions may be 10 – 100 percent wt $Al_2O_3$ and 0 – 90 percent $SiO_2$. Halogen is preferably absent from this first stage catalyst.

The Group VIa metals are chromium, molybdenum and tungsten, and the preferred Group VIII metals are the iron group metals, i.e. iron, cobalt, and nickel. These components are normally used in the form of oxides or sulphides. If platinum group metals are used they are normally present as metals or metal sulphides. The amounts of the hydrogenating components may be

| | | |
|---|---|---|
| Group VIa metals | 2 – 25% wt | (expressed as metal) |
| Iron Group metals | 1 – 15% wt | ('') |
| Platimum Group metals | 0.1 – 5% wt | ('') |

Preferred hydrogenating components are from 2 – 25 percent wt of molybdenum (expressed as metal but present as oxide or sulphide) and 1 – 15 percent wt of cobalt and/or nickel (again expressed as metal but present as oxide or sulphide). Another suitable combination may be tungsten-nickel-sulphide with from 0.1 percent to 30.0 percent wt tungsten and 0.1 percent to 20.0 percent wt nickel expressed as metal.

The precise level of V.I. improvement required can be determined by experiment and a large improvement may be unnecessary. In fact, as described hereafter, desulphurisation is the more significant reaction. In practice feedstocks with V.I.'s of 45 to 65, pour points of 30° to 50°C and sulphur contents of 2 percent to 4 percent wt can be treated to give products boiling above 370°C with V.I.'s of 60 to 100, pour points of 30° to 50°C and sulphur contents of 0.001 to 0.5 percent wt. The other main process conditions can be chosen from the following ranges:

| | | |
|---|---|---|
| Space velocity | v/v/hr | 0.1 – 5 |
| $H_2$ gas rate | m³/m³ | 360 – 1800 |

Product from this first stage can be worked up in known manner e.g. separation of a recycle gas with removal of H₂S and NH₃ and, if desired, removal of product boiling below the boiling point of the initial feedstock.

In practice it has been found that optimum results are achieved, in terms of maximum yield of desired final product if the first stage severity is such that the sulphur content of the product passing to the catalytic dewaxing stage is from 0.1 to 0.2 percent wt. Higher sulphur contents lower the activity of the dewaxing catalyst, thereby reducing yield for a given pour point. Lower sulphur contents do not give a large improvement in the activity of the dewaxing catalyst and require a higher severity and hence lower yield in the first stage.

The catalytic dewaxing stage may be essentially as described in UK Pat. No. 1,236,223 and the earlier UK Pat. Nos. 1,088,933 and 1,134,014. Thus the catalyst may be from 0.1 to 5 percent of a platinum group metal, particularly platinum itself, incorporated with a crystalline mordenite having an alkali metal content of less than 2.2wt, particularly a decationised mordenite. The preferred SiO₂ : Al₂O₃ ratio of the mordenite is from 14:1 to 50:1. The other main process conditions may be chosen from:

| Space velocity | v/v/hr | 0.5 – 10 |
| H₂ gas rate | m³/m³ | 900 – 2700 |

In practice products from the first stage with, as indicated above, V.I.'s of from 60 to 100, pour points of from 30° to 50°C and sulphur contents of 0.001 to 0.5 percent wt can be catalytically dewaxed to give products boiling above 370°C having V.I.'s of from 30 to 90, pour points of −48° to +9°C and sulphur contents of 0.001 to 0.5 percent wt.

Second stage product work up may be as for the other stages. The wax is catalytically cracked to light paraffinic hydrocarbons up to $C_7$, particularly $C_3$ and $C_4$ paraffins, which may be recovered as useful by-products.

The product from the first two stages, while of suitable pour point may be rather low in viscosity index and the object of the third stage is to improve the viscosity index without adversely affecting the pour point, i.e., the increase in pour point is preferably nil and at most 6°C. As previously stated, the second stage products may have V.I.'s of from 30 to 90 and these can be increased to from 75 to 125 while keeping the pour point within the range −48° to +9°C.

The hydrogenating components and the support may be as for the first stage catalyst.

The halogen may be chlorine or fluorine particularly the latter, and it is this component which provides the key to the process. The halogen content is preferably from 0.5 to 7.0 percent wt and may be added in known manner. Thus it may be added by impregnating the support with a solution of a halogen acid, e.g. hydrofluoric acid, or a halide, e.g. ammonium fluoride, or by passing vapours of an organic halogen compound over the support under conditions which decompose the compound. Suitable compounds are fluorinated derivatives of $C_1 - C_4$ aliphatic hydrocarbons, e.g. carbon tetrafluoride.

The other main process conditions may be chosen from the following ranges.

| Space velocity | v/v/hr | 0.1 – 5.0 |
| H₂ gas rate | m³/m³ | 100 – 2,000 |

The reactor effluent may be treated in known manner to separate a hydrogen-rich recycle gas which may be scrubbed to remove any H₂S and NH₃ and a product fraction which may be fractionated to remove constituents boiling below the boiling point of the feedstock.

The term viscosity index as used in this specification means that determined by ASTM D 92 −57.

The invention is illustrated by the following examples.

EXAMPLE 1

The feedstock was a straight run distillate lubricating oil fraction from Kuwait crude having a boiling range of 480° to 550°C. Portions of it were treated in three stages to improve V.I. and pour point.

The catalyst compositions were

| First Stage | Second Stage |
|---|---|
| 1.98% wt nickel oxide | 0.577% wt platinum |
| 2.58% wt cobalt oxide | balance mordenite with |
| 9.29% wt molybdenum oxide | 0.75% wt sodium |
| 0.1% wt silica | 16.8 SiO₂:Al₂O₃ mole ratio |
| 86.1% wt alumina | 340 m²/g surface area |
| 295 m²/g surface area | |

The third stage treatment used two catalysts, of cobalt and molybedenum oxides on silica-alumina one fluorinated and the other not. The non-fluorinated catalyst, used for comparative purposes had the following amounts of Co, Mo and Si, expressed as metal the element, but present as oxides. The balance was alumina.

| Cobalt | % wt | 1.75 |
| Molybdenum | % wt | 12.7 |
| Silicon | % wt | 9.0 |
| Fluorine | % wt | NIL |
| Surface area | m²/g | 331 |

The catalyst of the present invention was fluorinated by allowing 100 mls of the CoMo/silica-alumina to remain in contact with 10 g of NH₄F in 100 mls of deionized water for 24 hours. The catalyst was filtered off, dried at 120°C for 16 hours, and calcined at 550°C for 2 hours. It contained 6.1 percent wt of fluorine. The process conditions used and the results obtained with the two catalysts are set out in Tables 1 and 2 below. Table 1 shows the results with the comparative non-fluorinated third stage catalyst, and Table 2 the results with the fluorinated third stage catalyst of the present invention.

TABLE 1

|  |  | Feedstock | First Stage | Second Stage | Third Stage |
|---|---|---|---|---|---|
| Operating conditions | | | | | |
| Catalyst | | — | NiCoMo/alumina | Platinum-hydrogen mordenite | CoMo/silica-alumina |
| Temperature | °C | — | 400 | 400 | 385 |
| Pressure | bars gauge | — | 100 | 100 | 100 |
| Space velocity | v/v/hr | — | 1.0 | 1.0 | 1.0 |
| $H_2$ gas rate | $m^3/m^3$ | — | 1,250 | 840 | 840 |
| Inspection data on material boiling above the indicated flash point | | | | | |
| Kinematic viscosity at 38°C | cS | 278.8 | 79.76 | 113.8 | 67.70 |
| Pour point | °C | −18 * | −15 * | −12 | −3 |
| Viscosity Index | | 51 | 83 | 70 | 85 |
| Flash Point | °C | 229 | 196 | 213 | 185 |
| Sulphur | % wt | 3.03 | 0.20 | 0.23 | 0.011 |
| Yield | % wt | — | 87.6 | 73.2 | 92.4 |

*Data on solvent dewaxed material

Table 2

|  |  | Feedstock | First Stage | Second Stage | Third Stage |
|---|---|---|---|---|---|
| Operating Conditions | | | | | |
| Catalyst | | — | NiCoMo/Alumina | Platinum-Hydrogen Mordenite | Fluorinated CoMo/Silica-Alumina |
| Temperature | °C | — | 387 | 375 | 394 |
| Pressure | bars gauge | — | 103 | 103 | 103 |
| Space velocity | v/v/hr | — | 1.0 | 1.0 | 0.5 |
| $H_2$ gas rate | $m^3/m^3$ | — | 1250 | 840 | 840 |
| Inspection data on material boiling above the indicated flash point | | | | | |
| Kinematic Viscosity at 38°C | cS | 278.8 | 106.7 | 159.7 | 43.54 |
| Pour Point | °C | −18 + | −18 + | −9 | −9 |
| Viscosity Index | | 51 | 76 | 59 | 94 |
| Flash Point | °C | 229 | 213 | 227 | 188 |
| Sulphur Content | % wt | 3.03 | 0.27 | 0.27 | 0.0055 |
| Yield | % wt | — | 87.1 | 73.7 | 69.8 |

+ Data on solvent dewaxed material

Slightly different conditions were used in the first two stages of Tables 1 and 2 giving a slightly different product passing to the third stages. The third stage process conditions were also somewhat different. However, the benefit of using a fluorinated catalyst in the third stage is still readily apparent. The comparative catalyst gave an unacceptable increase in pour point from −9° to −3°C and only a moderate increase in VI. The fluorinated catalyst gave no decrease in pour point and a much greater improvement on VI.

EXAMPLE 2

A three stage process according to Example 1 using the same feedstock and a fluorinated third stage catalyst was carried out, using a CoMo/alumina catalyst in the first stage instead of a NiCoMo/alumina. The catalyst composition was

| CoO % wt | 3.93 |
| $MoO_3$ " | 19.7 |
| $SiO_2$ | <0.1 |
| $Al_2O_3$ | 71.4 |
| Surface area $m^2/g$ | 120 |

Process conditions and product inspection data for the three stages are shown in Table 3 below.

Table 3

|  | Feedstock | First Stage | Second Stage | Third Stage |
|---|---|---|---|---|
| Operating Conditions | | | | |
| Catalyst | — | CoMo/Alumina | Platinum-Hydrogen Mordenite | Fluorinated CoMo/Silica-Alumina |
| Temperature | — | 388 | 385 | 385 |
| Pressure | — | 103 | 103 | 103 |
| Space velocity | — | 1.0 | 1.0 | 0.5 |
| $H_2$ gas rate | — | 1,250 | 840 | 840 |
| Inspection data on material boiling above the indicated >flash point | | | | |
| Kinematic Viscosity at | 38°C cS | 278.8 | 76.44 | 130.3 | 46.24 |
| Pour Point | °C | −18 + | −15 + | −15 | −15 |
| Viscosity Index | | 81 | 87 | 63 | 95 |
| Flash Point | °C | 229 | 199 | 210 | 188 |
| Sulphur Content | % wt | 3.03 | 0.057 | 0.10 | — |
| Yield | % wt | — | 83.9 | 68.2 | 69.7 |

+ Data on solvent dewaxed material

EXAMPLE 3

The accompanying graph shows the changes in product viscosity and viscosity index when operating according to Table 2 of Example 1 but varying the severity of the first stage to give products with sulphur contents of 0.20 and 0.27 percent wt respectively. Each product was then catalytically dewaxed to a pour point of −12°C, and hydrogenated over the fluorinated catalyst to increase the V.I. while keeping the −12°C pour point. The 0.18 percent wt S content first stage product was hydrogenated to 95 V.I. and the 0.26 percent wt S content product was given two different treatments to 93 and 105 V.I.

The graph shows that the viscosity/viscosity index relationship was not affected by the variation in sulphur content. The overall yield was, however, different in the two cases and a further series of experiments was carried out according to Table 3 of of Example 2 to determine the optimum first stage product sulphur content for maximum yield. 4 runs were carried out to give first stage products with sulphur contents of 0.016, 0.059, 0.12, and 0.24 percent wt respectively which were then catalytically dewaxed. The first three products were also hydrogenated over the fluorinated catalyst. The results are set out in Table 4 below.

The pressures, space velocities and gas rates in all three stages were the same as in Table 3, variations in product quality being obtained by temperature variation, except that, with the first stage product of 0.24 percent wt S content, the second stage space velocity had to be reduced to 0.5 v/v/hr to give a pour point of −12°C.

It will be seen that similar products were obtained in the three complete runs but that the yield increased with increasing first stage product sulphur content. Although the yields in the first two stages of the fourth run were slightly higher than for the third run, it was found that the required second stage product pour point in the fourth run could only be obtained by reducing the space velocity. The fourth run product was, therefore, not treated in the third stage, and by extrapolation the optimum first stage product sulphur content for maximum yield was found to be 0.15 percent wt.

We claim:

1. A wholly catalytic process for the production of lubricating oils from a petroleum feedstock boiling above 350°C without the use of solvents for aromatic and wax removal comprising the steps of passing the oil over a catalyst comprising one or more hydrogenating components selected from Groups VIa and VIII of the Table 4

| First stage product | | | | | |
|---|---|---|---|---|---|
| Sulphur content | % wt | 0.016 | 0.059 | 0.12 | 0.24 |
| Yield | % wt | 77 | 85 | 89 | 91 |
| Second stage product | | | | | |
| Pour Point | °C | −15 | −12 | −18 | −12 |
| Yield on original feed | % wt | 50 | 61 | 66 | 68 |
| Third stage | | | | | |
| Temperature | °C | 379.5 | 384.5 | 399 | — |
| Final Product Data | | | | | |
| Kinematic viscosity at | 38°C cS | 43.12 | 46.22 | 41.89 | — |
| Viscosity Index | | 96 | 94 | 94 | — |
| Pour point | °C | −15 | −12 | −9 | — |
| Yield on original feed | % wt | 32 | 44 | 45 | — |

Periodic Table on a refractory oxide support together with hydrogen at a temperature of from 343° to 454°C and a pressure of 70 to 210 bars gauge, then over a catalyst comprising one or more hydrogenating components selected from Groups VIa and VIII of the Periodic Table incorporated with a crystalline mordenite of reduced alkali metal content together with hydrogen at a temperature of from 250° to 500°C and a pressure of from 7 to 210 bars gauge, and then over a catalyst comprising one or more hydrogenating components selected from Groups VIa and VIII of the Periodic Table on a refractory oxide support containing 1 to 10 percent wt of halogen together with hydrogen at a temperature of from 200° to 450°C and a pressure of from 30 to 210 bars gauge and recovering a product of decreased pour point and increased viscosity index as compared with the feedstock.

2. A process as claimed in claim 1 wherein the feedstock is a vacuum distillate fraction boiling within the range 350° to 600°C.

3. A process as claimed in claim 1 wherein the first and third stage catalysts contain, as hydrogenating components, 2 – 25 percent wt of a Group VIa metal and 1 – 15 percent wt of one or more iron group metals both by weight of total catalyst and, as support, 10 to 100 percent wt alumina and 0 – 90 percent wt silica, both by weight of the support.

4. A process as claimed in claim 1, wherein the first stage is operated to give a first stage product sulphur content of 0.1 to 0.2 percent wt.

5. A process as claimed in claim 1 wherein the second stage catalyst contains from 0.1 to 5 percent wt of a platinum group metal incorporated with a crystalline mordenite having an alkali metal content of less than 2 percent wt.

6. A process as claimed in claim 5 wherein the mordenite is a decationised mordenite having a $SiO_2:Al_2O_3$ ratio of from 14:1 to 50:1.

7. A process as claimed in claim 1 wherein the halogen of the third stage catalyst is fluorine.

8. A process as claimed in claim 1 wherein the halogen content of the third stage catalyst is from 3 to 7 percent wt.

* * * * *